United States Patent
Yamamoto et al.

(10) Patent No.: US 10,325,094 B2
(45) Date of Patent: Jun. 18, 2019

(54) PROCESS ANALYSIS APPARATUS, PROCESS ANALYSIS METHOD, AND PROCESS ANALYSIS FOR DETERMINING INPUT/OUTPUT RELATION OF A BLOCK OF EXECUTION TRACE TO DETECT POTENTIAL MALWARE

(71) Applicant: MITSUBISHI ELECTRIC CORPORATION, Tokyo (JP)

(72) Inventors: Takumi Yamamoto, Tokyo (JP); Shoji Sakurai, Tokyo (JP); Kiyoto Kawauchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 174 days.

(21) Appl. No.: 15/500,476

(22) PCT Filed: Aug. 28, 2014

(86) PCT No.: PCT/JP2014/004417
§ 371 (c)(1),
(2) Date: Jan. 30, 2017

(87) PCT Pub. No.: WO2016/030927
PCT Pub. Date: Mar. 3, 2016

(65) Prior Publication Data
US 2017/0337378 A1    Nov. 23, 2017

(51) Int. Cl.
*G06F 21/00* (2013.01)
*G06F 21/56* (2013.01)

(52) U.S. Cl.
CPC .......... *G06F 21/567* (2013.01); *G06F 21/562* (2013.01); *G06F 21/566* (2013.01); *G06F 2221/033* (2013.01)

(58) Field of Classification Search
None
See application file for complete search history.

(56) References Cited

U.S. PATENT DOCUMENTS 6,157,720 A    12/2000  Yoshiura et al.
7,093,239 B1 *  8/2006  van der Made ...... G06F 21/562
                                              714/38.13
(Continued)

FOREIGN PATENT DOCUMENTS

JP    9-230786 A     9/1997
JP    2003-114616 A  4/2003
(Continued)

OTHER PUBLICATIONS

Bhunia, Swarup, et al. Hardware Trojan Attacks: Threat Analysis and Countermeasures. Proceedings of the IEEE, vol. 102, Issue: 8. https://ieeexplore.ieee.org/stamp/stamp.jsp?tp=&arnumber=6856140 (Year: 2014).*

(Continued)

*Primary Examiner* — Jeremiah L Avery
(74) *Attorney, Agent, or Firm* — Birch, Stewart, Kolasch & Birch, LLP

(57) ABSTRACT

The present invention relates to a process analysis apparatus for analyzing a process executed in an information processing unit and extracting encryption logic such as an encryption function or a decryption function used in the process. The process analysis apparatus is provided with an execution trace acquisition section to acquire an execution trace of a process to be analyzed; a block extraction section to extract, from the execution trace, a block that is a processing unit indicating a loop structure; a block information extraction section to extract, from the block, block information including input information and output information; and a block information analysis section to generate characteristic determination information for determining a characteristic (Continued)

of an input/output relation of the block, using the input information or the output information of the block information, analyzing the input/output relation of the block, using the characteristic determination information, and determining the block which indicates a characteristic of an input/output relation of an encryption function or a decryption function, as the encryption logic.

7 Claims, 14 Drawing Sheets

(56) References Cited

U.S. PATENT DOCUMENTS

| | | | |
|---|---|---|---|
| 7,596,227 B2* | 9/2009 | Illowsky | G06F 1/3203 380/277 |
| 8,027,473 B2* | 9/2011 | Stiscia | H04L 63/0428 370/397 |
| 8,661,539 B2* | 2/2014 | Hodges | H04L 29/06 709/224 |
| 9,015,301 B2* | 4/2015 | Redlich | G06Q 10/10 707/609 |
| 9,069,938 B2* | 6/2015 | Moritz | G06F 9/30003 |
| 2003/0079145 A1* | 4/2003 | Kouznetsov | G06F 21/56 726/22 |
| 2003/0233574 A1* | 12/2003 | Kouznetsov | G06F 21/56 726/23 |
| 2007/0192863 A1* | 8/2007 | Kapoor | G06F 9/505 726/23 |
| 2010/0234071 A1* | 9/2010 | Shabtay | H04B 7/0408 455/562.1 |
| 2010/0235913 A1* | 9/2010 | Craioveanu | G06F 21/563 726/23 |
| 2011/0161076 A1* | 6/2011 | Davis | G06F 3/04842 704/231 |
| 2011/0271341 A1 | 11/2011 | Satish et al. | |
| 2012/0079596 A1* | 3/2012 | Thomas | G06F 21/55 726/24 |
| 2012/0254982 A1* | 10/2012 | Sallam | G06F 21/564 726/16 |
| 2013/0198842 A1 | 8/2013 | Klein et al. | |
| 2013/0227689 A1* | 8/2013 | Pietrowicz | G01R 1/20 726/23 |
| 2014/0165203 A1* | 6/2014 | Friedrichs | G06F 21/56 726/24 |

FOREIGN PATENT DOCUMENTS

| | | |
|---|---|---|
| JP | 2007-334536 A | 12/2007 |
| JP | 2009-37545 A | 2/2009 |
| JP | 2009-181335 A | 8/2009 |
| JP | 2010-15513 A | 1/2010 |
| JP | 2012-32523 A | 2/2012 |
| JP | 2012-83849 A | 4/2012 |
| JP | 2012-103893 A | 5/2012 |
| JP | 2013-84064 A | 5/2013 |
| JP | 2013-92981 A | 5/2013 |
| JP | 2013-109553 A | 6/2013 |
| JP | 2013-114637 A | 6/2013 |
| JP | 2013-529335 A | 7/2013 |
| JP | 2013-168141 A | 8/2013 |

OTHER PUBLICATIONS

Sun, Li, et al. An automatic anti-anti-VMware technique applicable for multi-stage packed malware. 2008 3rd International Conference on Malicious and Unwanted Software (Malware). https://ieeexplore.ieee.org/stamp/stamp.jsp?tp=&arnumber=4690853 (Year: 2008).*

Sion, Radu; Chen, Yao. Fighting Mallory the Insider: Strong Write-Once Read-Many Storage Assurances. IEEE Transactions on Information Forensics and Security, vol. 7, Issue: 2. https://ieeexplore.ieee.org/stamp/stamp.jsp?tp=&arnumber=6046131 (Year: 2012).*

"TEMU: The BitBlaze Dynamic Analysis Component", Jun. 12, 2014, http://bitblaze.cs.berkeley.edu/temu.html, pp. 1-2.

Berkowits, "Pin—A Dynamic Binary Instrumentation Tool", Wednesday, Jun. 13, 2012.

Calvet et al., "Aligot: Cryptographic Function Identification in Obfuscated Binary Programs", Oct. 16-18, 2012, Raleigh, North Carolina, USA.

Gröbert et al., "Automated Identification of Cryptographic Primitives in Binary Programs", pp. 1-20, Pub: 2011.

Jimbo et al., "A Shellcode Analysis Method using CPU Emulator and Dynamic Binary Instrumentation", The Institute of Electronics Information and Communication Engineers, 2010, pp. 59-64.

Li et al., "CipherXRay: Exposing Cryptographic Operations and Transient Secrets from Monitored Binary Execution", IEEE Transactions on Dependable and Secure Computing, vol. 11, No. 2, Mar./Apr. 2014, pp. 101-114.

Lutz, "Towards Revealing Attackers' Intent by Automatically Decrypting Network Traffic", Master Thesis MA-2008-08, Jan. 2008 to Jul. 2008, pp. 1-52.

Matenaar et al., "CIS: The Crypto Intelligence System for Automatic Detection and Localization of Cryptographic Functions in Current Malware", RWTH Aachen, Germany, felix.matenaar@rwth-aachen.de, Pub: 2013.

Tubella et al., "Control Speculation in Multithreaded Processors through Dynamic Loop Detection", e-mail: {jordit,antonio}@ac.upc.es, Pub: 1998.

Wang et al., "ReFormat: Automatic Reverse Engineering of Encrypted Messages", North Carolina State University {zhi_wang,xjiang4,mcgrace}@ncsu.edup, Pub: 2009.

* cited by examiner

Fig. 3

| ROW NUMBER OF EXECUTION TRACE (DECIMAL NUMBER) | ADDRESS WITH COMMAND (HEXADECIMAL NUMBER) | CHANGED STORAGE AREA (ADDRESS IN HEXADECIMAL NOTATION) | NEW VALUE | SIZE (BYTE) |
|---|---|---|---|---|
| 3704 | 0x40a905 | M@0x0012ff48 | 0x00410054 | 4 |
| 3705 | 0x40a909 | R@edx | 0x0041004c | 4 |
| 3706 | 0x40a90c | R@ecx | 0x00000001 | 4 |
| : | : | : | : | : |

Fig. 4

| STORAGE AREA (BEGINNING ADDRESS) | VALUE (BYTE SEQUENCE) | SIZE (BYTE) | INFORMATION TYPE |
|---|---|---|---|
| M@0x0012ff48 | 0x00, 0x01, 0x02, 0x03<br>0x04, 0x05, 0x06, 0x07<br>0x08, 0x09, 0x0A, 0x0B<br>0x00, 0x0D, 0x0E, 0x0F | 16 | BUFFER |
| R@ecx | 0x00, 0x00, 0x00, 0x01 | 4 | COUNTER |
| M@0x0012ff48 | 0x01 | 4 | END CONDITION |
| : | : | : | : |

|      | 0 | 1 | 2 | 3 | 4 | 5 | 6 | 7 | 8 | 9 | A | B | C | D | E | F |
|------|---|---|---|---|---|---|---|---|---|---|---|---|---|---|---|---|
| ...  |   |   |   |   |   |   |   |   |   |   |   |   |   |   |   |   |
| 82A0 | あ | い | ぃ | う | ぅ | え | ぇ | ぉ | お | か | が | き | ぎ | く | ぐ | け |
| 82B0 | げ | こ | ご | さ | ざ | し | じ | す | ず | せ | ぜ | そ | ぞ | た | だ | ち |
| 82C0 | ぢ | っ | つ | づ | て | で | と | ど | な | に | ぬ | ね | の | は | ば | ぱ |
| :    | : | : | : | : | : | : | : | : | : | : | : | : | : | : | : | : |

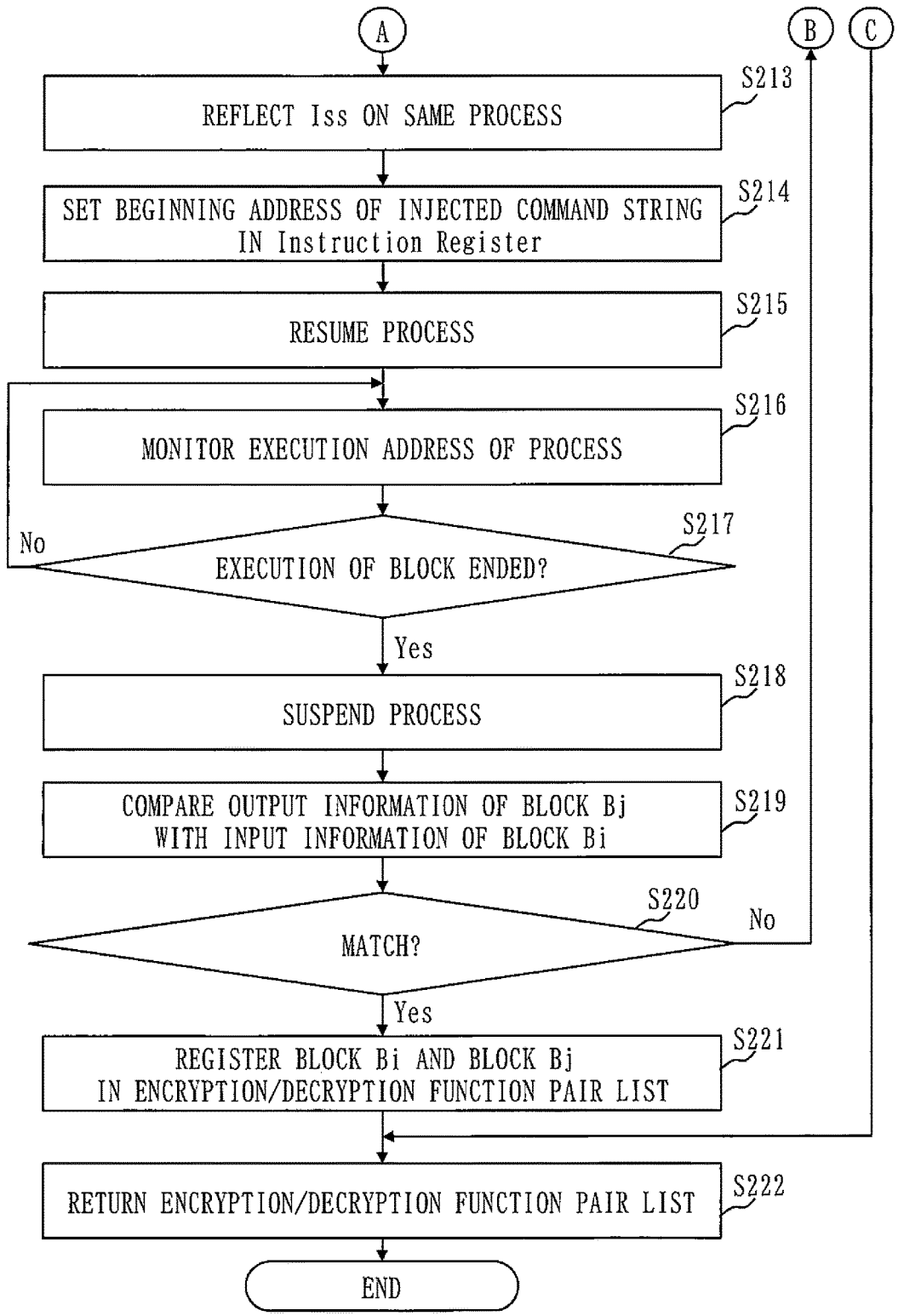

PROCESS ANALYSIS APPARATUS, PROCESS ANALYSIS METHOD, AND PROCESS ANALYSIS FOR DETERMINING INPUT/OUTPUT RELATION OF A BLOCK OF EXECUTION TRACE TO DETECT POTENTIAL MALWARE

TECHNICAL FIELD

The present invention relates to a process analysis apparatus which analyzes a process executed in an information processing unit and extracts encryption logic, such as an encryption function or a decryption function, used in the process.

BACKGROUND ART

A "targeted attack", called Advanced Persistent Threat (APT), has become noticeable recently as a new security threat that targets and makes persistent attacks on a specific organization. APT infects a terminal of a targeted organization with malware through email, and the infecting malware communicates with the server of the attacker outside and download new attack programs or transmit confidential information in the system of the organization. To detect such a security incident at an early stage, and prevent damage from spreading, a "Security Operation Center" (SOC) service is needed to monitor various logs in network devices and detect suspicious signs. If an incident is detected, the organization has to carry out an incident response including investigation into the cause of the incident and damage, studies on countermeasures, restoration of the service, implementation of preventive measures of recurrence, and the like. Furthermore, depending on the client or business partner of the organization, the organization also needs to clarify what has been leaked out and what has not been leaked out of the confidential information.

Network forensics play an important role for the organization to investigate the cause of the incident and the damage. Network forensics analyze a log generated by a personal computer, a server, a network device or the like, or a packet recorded on a network, and investigate the intrusion route of malware, an infected terminal, accessed information, attacker's commands, information transmitted outside, and the like. Malware, however, uses cryptographic technologies to keep communications secret, these days. Therefore, to identify, by tracing, commands transmitted from an attacker and information transmitted outside has become difficult if the organization implements network forensics.

To address this issue, the encryption logic and key that have been used by the malware for keeping the communication secret need to be identified to decrypt the encrypted communication. Usually, in this process, the binary of malware programs need to be analyzed. Existing encryption logic extraction methods mostly specify the encryption logic and key by searching the execution trace obtained when malware is executed, for a typical characteristic of encryption logic, like the malware analysis system disclosed in Patent Document 1, for example. Among binary analysis technologies of malware programs, the technologies disclosed in Non-Patent Documents 1 through 9 are known.

CITATION LIST

Patent Literature

Patent Document 1: JP 2013-114637 A

Non-Patent Literature

Non-Patent Document 1: Noe Lutz, Towards Revealing Attacker's Intent by Automatically Decrypting Network Traffic, Master Thesis MA-2008-08.

Non-Patent Document 2: Zhi Wang, Xuxian Jiang, Weidong Cui, Xinyuan Wang and Mike Grace, ReFormat: automatic reverse engineering of encrypted messages, Proceedings of the 14th European Conference on Research in Computer Security.

Non-Patent Document 3: Felix Matenaar, Andre Wichmann, Felix Leder and Elmar Gerhards-Padilla, CIS: The Crypto Intelligence System for Automatic Detection and Localization of Cryptographic Functions in Current Malware, Proceedings of the 7th and Unwanted Software (Malware 2012).

Non-Patent Document 4: Xin Li, Xinyuan WaInternational Conference on Malicious ng, Wentao Chang, CipherXRay: Exposing Cryptographic Operatens and Transient Secrets from Monitored Binary Execution, IEEE TRANSACTIONS ON DEPENDABLE AND SECURE COMPUTING (preprint) 2012.

Non-Patent Document 5: Felix Grobert, Carsten Willems, and Thorsten Holz, Automated Identification of Cryptographic Primitives in Binary Programs, Proceedings of the 14th International Conference on Recent Advances in Intrusion Detection.

Non-Patent Document 6: Joan Calvet, Jose M. Fernandez, Jean-Yves Marion, Aligot: Cryptographic Function Identification in Obfuscated Binary Programs, Proceedings of the 19th ACM Conference on Computer and Communications Security, CCS 2012.

Non-Patent Document 7: Intel, Pin—A Dynamic Binary Instrumentation Tool, https://software.intel.com/en-us/articles/pin-a-dynamic-binary-instrumentation-tool Non-Patent Document 8: BitBlaze, TEMU: The BitBlaze Dynamic Analysis Component, http://bitblaze.cs.berkeley.edu/temu.html Non-Patent Document 9: Jordi Tubella and Antonio Gonzalez, Control Speculation in Multithreaded Processors through Dynamic Loop Detection, In Proceedings of the Fourth International Symposium on High-Performance Computer Architecture, pp.14-23, 1998.

SUMMARY OF INVENTION

Technical Problem

In the conventional technology typified by Patent Document 1, a lot of irrelevant types of logic are extracted as encryption logic candidates. The problem is that the malware analyst has to get rid of irrelevant logic manually, which requires a great deal of time and effort. Therefore, there is a need for a highly accurate encryption logic extraction technology to suppress extracting irrelevant logic.

The present invention is directed to solving problems such as that described above. An objective of the invention is to specify, with accuracy, encryption logic used by malware, by analyzing the execution trace of the malware, based on the characteristic of the encryption logic used by the malware for encrypting files and communications.

Solution to Problem

To solve the problems described above, a process analysis apparatus of the present invention may include:

an execution trace acquisition section to acquire an execution trace of a process to be analyzed;
a block extraction section to extract, from the execution trace, a block that is a processing unit indicating a loop structure;
a block information extraction section to extract, from the block, block information including input information and output information; and
a block information analysis section to:
generate characteristic determination information for determining a characteristic of an input/output relation of the block, using one of the input information and the output information of the block information;
analyze the input/output relation of the block, using the characteristic determination information: and
determine the block which indicates a characteristic of an input/output relation of one of an encryption function and a decryption function, as encryption logic.

Advantageous Effects of Invention

The present invention has an advantageous effect of specifying, with accuracy, encryption logic used by malware, by generating characteristic determination information for determining the characteristic of the input/output relation of a block extracted from the execution trace; analyzing the input/output relation of the block, using the characteristic determination information; and determining a block indicating the characteristic of an input/output relation of an encryption function or a decryption function, as encryption logic.

BRIEF DESCRIPTION OF DRAWINGS

FIG. 3 is a diagram illustrating an example of a definition list 105.
FIG. 4 is a diagram illustrating an example of a data format in which input information and output information are stored.
FIG. 19 is a flow chart illustrating a flow (last half) of the virtual execution analysis by the virtual execution section 190 according to the fourth working example.

DESCRIPTION OF EMBODIMENTS

First Embodiment

Figure 1:
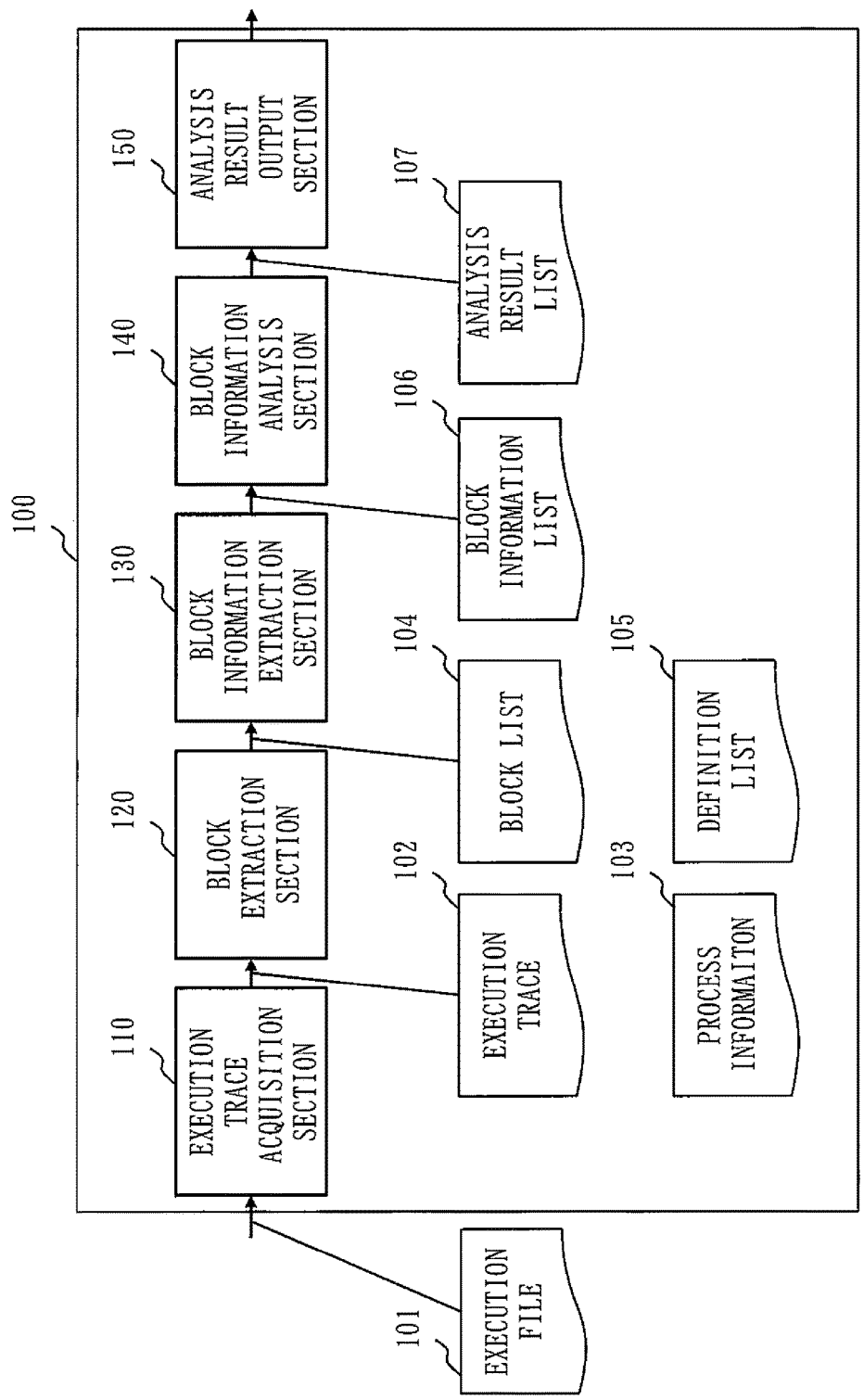
FIG. 1 is a configuration diagram illustrating an example of the configuration of a process analysis apparatus according to a first embodiment.

FIG. 1 is a configuration diagram illustrating an example of the configuration of a process analysis apparatus according to a first embodiment.
Referring to FIG. 1, a process analysis apparatus 100 includes an execution trace acquisition section 110, a block extraction section 120, a block information extraction section 130, a block information analysis section 140 and an analysis result output section 150.
The process analysis appartus 100 is a device for binary analysis of a malware program. The process analysis apparatus 100 is a computer in which a CPU (Central Processing Unit) connects, via a bus, to hardware devices such as a ROM, a RAM, a communication board, a display, a keyboard, a mouse, a magnetic disc device, and the like, for example. The process analysis apparauts 100 is also provided with a virtual machine on the CPU, which provides an execution environment for executing a malware program.
The execution trace acquisition section 110 executes an execution file 101 to be analyzed in the execution environment of the virtual machine, and acquires an execution trace 102 which is the log information of the executed process and process information 103 which is various types of information on the executed process.
The block execution section 120 extracts blocks, which are basic composition elements of a program, from the execute trace 102 acquired by the execution trace acquisition section 110, and outputs a block list 104 which is a list of extracted blocks. The block execution section 120 also extracts information required for block information analysis, which will be described later, from each row of the execution trace 102, and outputs a definition list 105.
The block information extraction section 130 extracts block information including the input/output information to be executed in the block, from the execution trace 102, the block list 104 and the definition list 105, and then outputs a block information list 106.
The block information analysis section 140 analyses whether or not the block to be analyzed is of encryption logic, using the block information list 106 outputted by the block information extraction section 130, and outputs an analysis result list 107.
The analysis result output section 150 outputs the content of the analysis result list 107 obtained through analysis by the block information analysis section 140 to a display, for example, for the analyst to see.

Process analysis by the process analysis apparatus 100 is discussed below with reference to the flow chart of FIG. 2.

Figure 2:
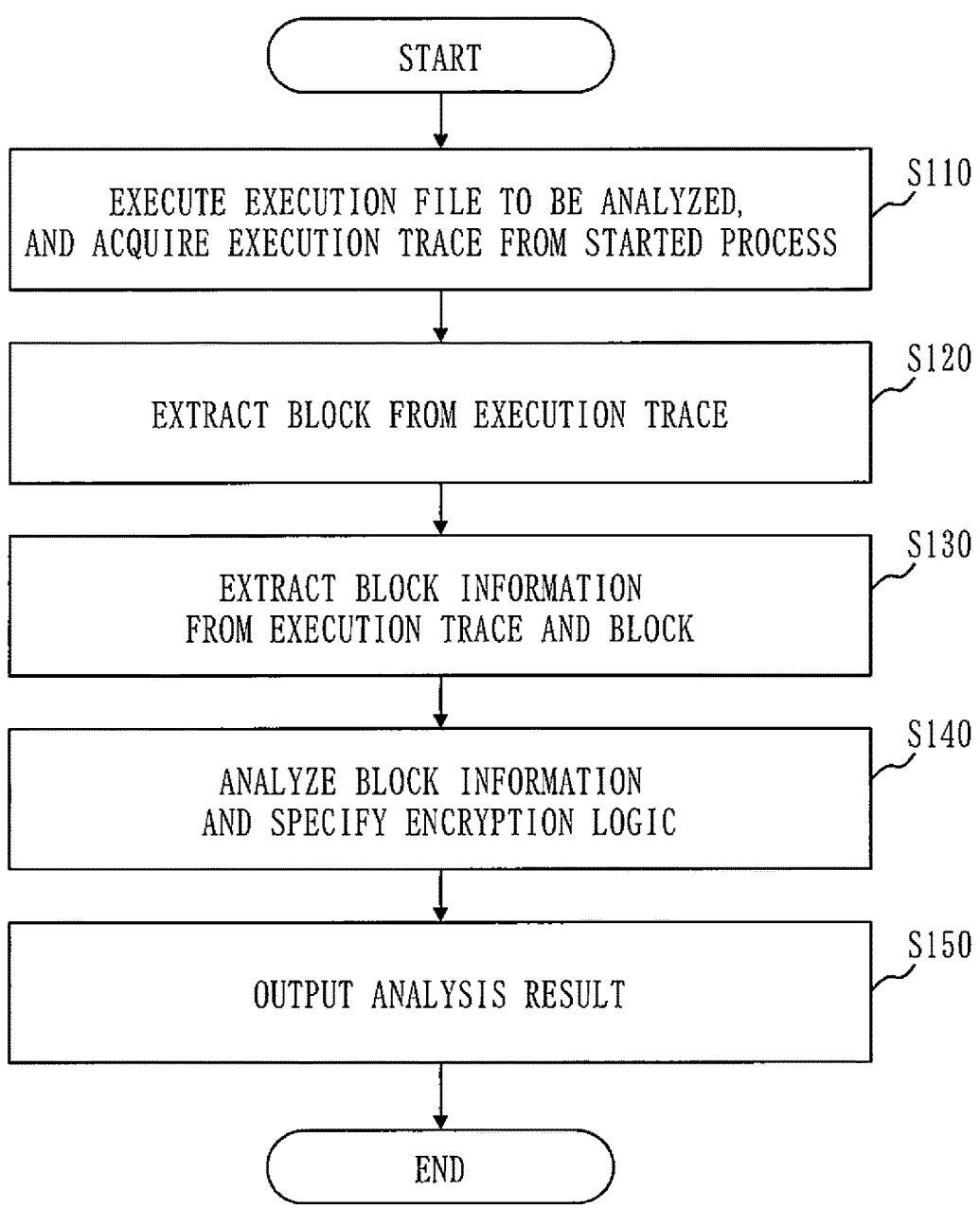
FIG. 2 is a flow chart illustrating a process flow of process analysis by the process analysis apparatus according to the first embodiment.

FIG. 2 is a flow chart illustrating a flow of process analysis by the process analysis apparatus according to the first embodiment.

First, in Step S110, the execution trace acquisition section 110 executes the program of the execution file 101 to be analyzed, in the analysis environment on the virtual machine or the like. The execution trace acquisition section 110 monitors the process of the executed program, and records the execution trace 102 of the process. The following pieces of information are recorded in the execution trace 102, for example:

Address of the executed command;
Address (operation code, operand) of the executed command;
Accessed register and the value thereof; and
Address, value and mode (READ/WRITE) of the accessed memory.

Among methods for acquiring the execution trace are a method using Dynamic Instrumentation Tool, such as Pin, described in Non-Patent Document 7, and a method using an emulator, such as TEMU, described in Non-Patent Document 8, for example. The execution trace acquisition section 110 acquires the execution trace, based on any of those existing methods.

At the same time as acquiring the execution trace 102, the execution trace acquisition section 110 extracts, as the process information 103, information about the DLL or function that has been loaded into the process that has acquired the execution trace 102. The following are pieces of information recorded in the process information 103, for example:

Base address of the process;
Name, address and size of DLL that has been loaded into the process; and
Name and address of API that has been exported from DLL A typical and practical example of the process information 103 is the PE header of the process that has been loaded to the memory.

In Step S120, the block extraction section 120 extracts, from the execution trace 102, a block which is a basic composition element of the program. Herein, the block is a function, a loop, loops in concatenation, or the like, and is provided with the following pieces of information indicating each of those:

Block ID;
Block type:
Block beginning address;
Block end address; and
In-block command string (acquired from a memory image of the process).

The block extraction section 120 manages the above block information for extracted blocks, as the block list 104.

Each piece of the information representing the block is described below.

As the block ID, a unique value in the block list is set. As the block type, the outmost logic (function, loop, loops in concatenation) making up the block is set. The block beginning address indicates the number identifying the location in the memory used by the process, at which the block has started. The block end address indicates the number, identifying the location in the memory used by the process, at which the block has ended. The in-block command string is a command sequence within the range from the beginning address to the end address in the memory used by the process.

The block extraction section 120 specifies a function, by tracing, in the execution trace 102, a relation between a function call command such as "call" and a return command such as "ret". The block extraction section 120 also specifies a loop, by tracing, in the execution trace, repetitions of a command pattern and Backward Jump. The block extraction section 120 also specifies loops in concatenation, by tracing, in the execution trace, an input/output relation between loops. With regard to the extraction of the block list 104, the technology disclosed in Non-Patent Document 5, 6 or 9 may be used, for example.

Further, in Step S120, the definition list 105 is generated as the information required in the steps discussed later.

FIG. 3 is a diagram illustrating an example of the definition list 105.

Referring to FIG. 3, the definition list 105 is a table of the following pieces of information recorded while the block extraction section 120 is reading the execution trace 102 row by row:

Row number of the execution trace;
Address, in the same row, at which a command has been executed
Storage area (register, memory), in the same row, in which a change has been made;
New value; and
Value size.

In Step S130, the block information extraction section 130 extracts block information from the execution trace 102 and the block (block list 104, definition list 105), and outputs the block information list 106. In the block information list 106, herein, block information including the following pieces of information is registered as an element:

Block ID;
Input information;
Output information; and
Context.

Each piece of the information representing the block information is described below.

The block ID is the information for association with a block registered in the block list 104.

The input information is the information that satisfies the following conditions, in the execution trace 102:

Information defined prior to execution of a block; and
Information read prior to overwriting, during execution of the block.

The output information is the information that satisfies the following condition, in the execution trace 102:

Last information written into the storage area (register or memory) during execution of the block.

The context is the information for indicating the timing at which a block has been executed in the execution trace 102.

Extractions of the input information, the output information, and the context are described below in detail.

First, the input information is extracted as follows.

The block information extraction section 130 analyzes the execution trace 102 row by row. Assume that the command address of the execution trace 102 being watched falls within the range from the beginning address to the end address of a block B1 registered in the block list 104. The block information extraction section 130 further analyzes the execution trace 102.

Assume that a command has been executed at an address X within the range of the block B1 and that a specific storage area has been read by executing READ by the command.

The block information extraction section 130 analyzes the definition list 105 to confirm whether the specific storage area has been written by WRITE executed by a command at an address before the address X, within the range of the block B1. When WRITE has not been executed, the block information extraction section 130 determines the specific storage area as the input information.

When READ has been executed for an adjacent memory area by the same command at the same address, in the execution trace 102, it is highly likely that the adjacent memory area has been accessed as a buffer, and therefore the adjacent memory area is also determined as the input information. In other words, the input information includes the beginning address and size of the adjacent memory area, and a byte sequence stored in the adjacent memory. The type of the input information, "buffer", is also recorded. With regard to the input information which is obtained by executing READ by the command at the same address, and whose value has been incremented or decremented, the type of the input information is determined as "counter". The type of the input information which is used as a loop-end condition in a loop, or used as an initial value of a counter, is determined as "end condition".

The output information is extracted as follows.

Assume that the block information extraction section 130 is analyzing the execution trace 102 of a block B1. Also assume that the block information extraction section 130 further analyzes the execution trace 102, and that the trace has gone beyond the range of the block B1. In this case, the block information extraction section 130 determines, by analyzing the definition list 105, the information which is written by executing WRITE by the command within the range of the block, as the output information. When WRITE has been executed multiple times for the same storage area, one with the greatest row number in the execution trace 102, the latest one, is determined as the output information.

Similarly to the input information, when an adjacent memory area has been written by executing WRITE by the same command at the same address, in the execution trace 102, it is highly likely that the adjacent memory area has been accessed as buffer. Therefore, the adjacent memory area is also determined as the output information. In other words, the output information includes the beginning address and size of the adjacent memory area, and a byte sequence stored in the adjacent memory. The type of the output information, "buffer", is also recorded. With regard to the output information which is written by executing WRITE by the command at the same address, and whose value has been incremented or decremented, the type of the output information is determined as "counter". The type of the output information that is used as a loop-end condition in a loop, or used as the initial value of a counter, is determined as "end condition".

A data format in which the input information and the output information are stored is described below.

FIG. 4 is a diagram illustrating an example of the data format in which the input information and the output information are stored.

Referring to FIG. 4, the storage area (beginning address), the value (byte sequence), the size (byte) and the information type are stored as information relating to the input information or the output information.

The context is extracted as follows.

The context is the one to represent a call relation (nest relation) between blocks. Assume that B1, B2, B3, B4, B5, B6, B7 and B8 are blocks, for example. Then, assume that after the execution of B1 is completed, B2 is executed; B3 and B4 are executed within B2; and B5 is executed after the execution of B2 is completed. Further assume that B6 is executed within B5, and B7 is executed within B6; and then B8 is executed after the execution of B6 and the execution of B7 are completed.

In the call relation between blocks, the contexts of B1, B2, B5 and B8 are expressed by 1, 2, 3 and 4, respectively. The contexts of B3 and B4 executed within B2 are expressed by 2.1 and 2.2, respectively. Likewise, the context of B6 executed within B5 is expressed by 3.1. The context of B7 executed within B6 is expressed by 3.1.1. Expressing the contexts as described allows calls for the same block (same block ID) to be distinguished according to the place of call.

Alternatively, the context may be expressed in any format if the call relation (nest relation) between blocks can be expressed.

The block information extraction section 130 determines, while analyzing the execution trace 102, whether the block has come to an end, or a new block is called within the block, as follows:

In the case of a jump outside the range of the block by a command (e.g., "jmp", "jne" or "ret") other than the function call (e.g., "call" or "enter") while the execution trace 102 of the block is analyzed, it is indicated that the block has come to an end.

In the case of a jump outside the range of the block by the function call (e.g., "call" or "enter") while the execution trace 102 of the block is analyzed, it is considered that a new block is called within the block, without ending the block.

In a case other than those, where the execution trace 102 has gone beyond the range of a block while the execution trace 102 of that block is analyzed, it is indicated that the block has come to an end A description now returns to the flow chart of FIG. 2.

In Step S140, the block information analysis section 140 analyzes block information in the block information list 106, and specifies encryption logic. In the block information analysis, the block information analysis section 140 generates characteristic determination information for determining a characteristic of the input/output relation of blocks, using the input information or output information of the block information, analyzes the input/output relation of the block, using this characteristic determination information, and determines a block indicating the characteristic of the input/output relation of an encryption function or a decryption function, as encryption logic. The characteristic determination information generated by the block information analysis section 140 and the method for determining encryption logic using the characteristic determination information will be described in detail in a first working example through a fourth working example, discussed later. As a result of analysis of the block information, the block information analysis section 140 outputs the analysis result list 107 including the determination result of encryption logic.

Finally, in Step S150, the analysis result output section 150 organizes an analysis result based on the block list 104, the block information list 106 and the analysis result list 107, and outputs the following pieces of information:

Beginning address of encryption logic

Input information (storage area, value, size)

Output information (storage area, value, size)

Beginning address of decryption logic

Thus, the invention according to the first embodiment has an advantageous effect of specifying, with accuracy, encryption logic used by malware, by generating the characteristic determination information for determining the characteristic of the input/output relation of the block extracted from the execution trace; analyzing the input/output relation of the block, using the characteristic determination information; and determining the block indicating the characteristic of the input/output relation of the encryption function or the decryption function, as encryption logic.

The first working example to the fourth working example are discussed below for implementing the first embodiment in detailed and exact ways.

First Working Example

Usually, an input to an encryption function is plaintext and an output from the encryption function is a random byte sequence. Given this fact, the following characteristics can be seen: there is a high rate of printable character strings in an input to the encryption function and there is a low rate of printable character strings in an output from the encryption function.

Figure 5:
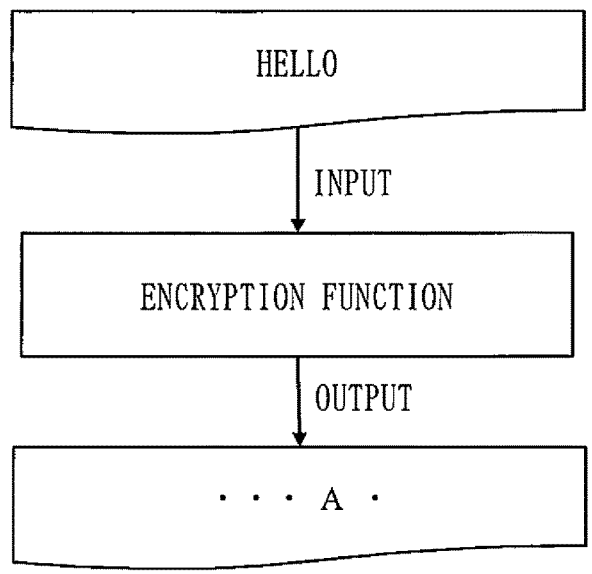
FIG. 5 is a diagram illustrating a characteristic of a printable character string included in input/output information of an encryption function.

FIG. 5 is a diagram illustrating the characteristics of printable character strings included in the input/output information of an encryption function.

Referring to FIG. 5, "Hello", which is to be inputted, is a printable character string, and "A" is a printable character string and "." denotes an unprintable character string of the outputted information. A first working example describes an example of specifying encryption logic by utilizing the characteristic of the printable character string included in the input/output information of the encryption function like the one described above, as characteristic determination information.

Figure 6:
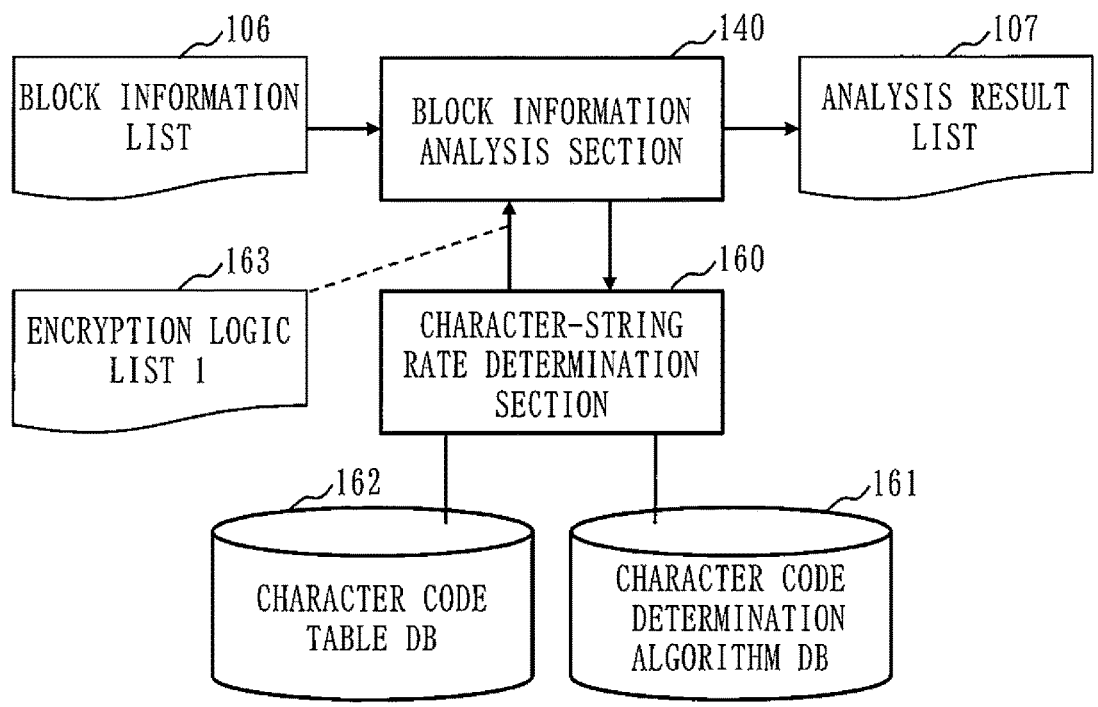
FIG. 6 is a configuration diagram illustrating an example of the configuration of a process analysis apparatus according to a first working example.

FIG. 6 is a configuration diagram illustrating an example of the configuration of the process analysis apparatus according to the first working example.

Referring to FIG. 6, the block information analysis section 140 includes a character-string rate determination section 160, a character code determination algorithm database (hereafter, the database is denoted by DB) 161, and a character code table DB 162. The block information analysis section 140 receives the block information list 106, performs a character-string rate determination process, and outputs the analysis result list 107. The character-string rate determination section 160 determines a printable character-string rate of the input information of the block information inputted from the block information analysis section 140 to specify encryption logic, and outputs an encryption logic list 1 (163) including the specified encryption logic, to the block information analysis section 140.

Alternatively, the character-string rate determination section 160, the character code determination algorithm DB 161, and the character code table DB 162 may be included in the block information analysis section 140.

A flow of the character-string rate determination process of the first working example is discussed below with reference to FIG. 7.

Figure 7:
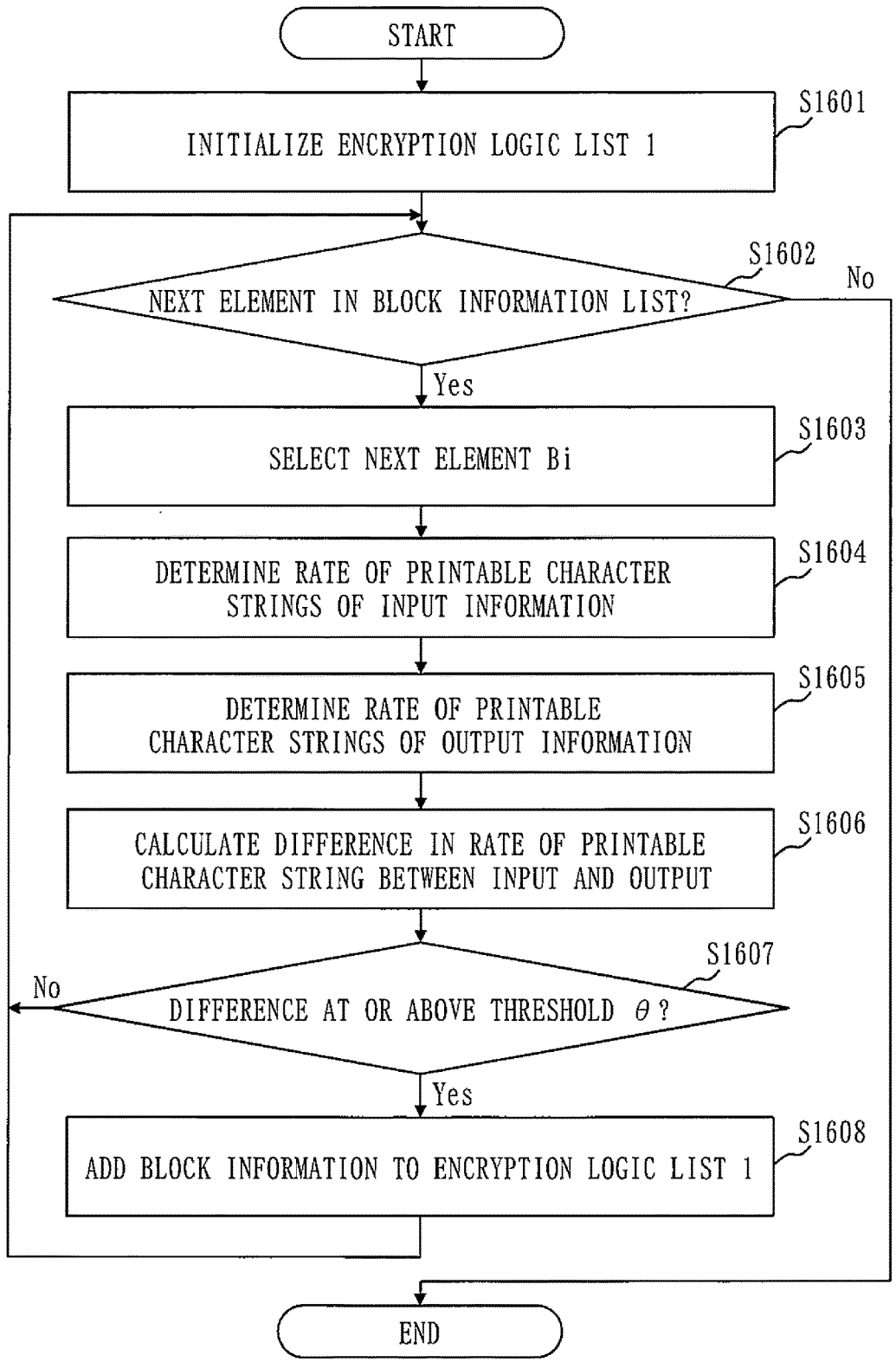
FIG. 7 is a flow chart illustrating a flow of character-string rate determination by a character-string rate determination section 160 according to the first working example.

FIG. 7 is a flow chart illustrating a flow of a character-string rate determination process of the character string rate determination section 160 according to the first working example.

First, in Step S1601, the character-string rate determination section 160 initializes the encryption logic list 1 (163). The encryption logic list 1 (163) is the block information list 106 which stores the block information that is determined as an encryption logic candidate by the character-string rate determination section 160.

In Step S1602, the character-string rate determination section 160 confirms whether there is the next element (block information) in the block information list 106. If there is no block information of the next element, the process comes to an end, proceeding through the branch of "No". If there is the block information of the next element, a next element Bi is selected in Step S1603.

In Step S1604, the character-string rate determination section 160 determines the rate of the printable character strings of the input information of the block information. The printable character string here is a printable character string of a chain of c letters ending with a new-line character or a null character. The character-string rate determination section 160 determines the character code of the byte sequence set to the value, for the input information whose information type is set to "buffer". This character code determination is executed by utilizing algorithms registered in the character-code determination algorithm DB 161. When the character code is determined, a corresponding character code table can be obtained from the character code table DB 162, and thereby the printable character can be confirmed.

Figures 8, 9:
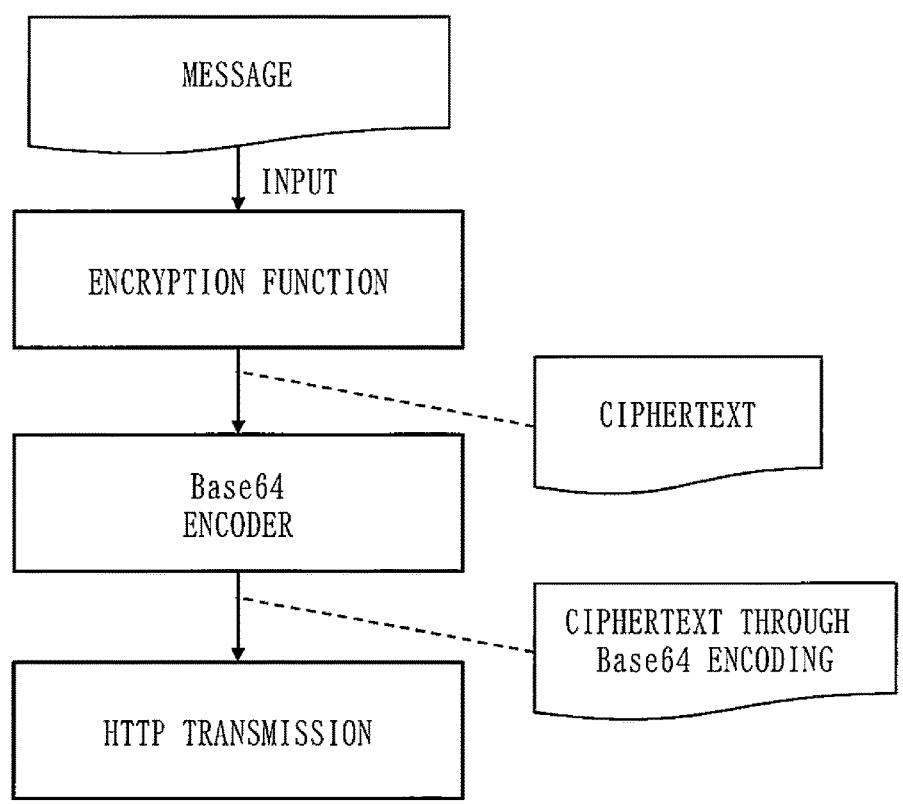
FIG. 8 is a diagram illustrating an example of a character code table stored in a character code table DB 162.
FIG. 9 is a diagram illustrating an example (1) of how to use an encryption function of malware.

FIG. 8 is a diagram illustrating an example of the character code table stored in the character code table DB 162.

FIG. 8 shows an example where character codes are stored in association with Japanese "hiragana" characters.

The character-string rate determination section 160 calculates the printable character-string rate by dividing the total sum of the printable character-string lengths of the printable character strings obtained from a byte sequence of the input information, by the same byte sequence length. Note that the character-string length is calculated with a multi-byte character as 2 bytes.

In Step S1605, the character-string rate determination section 160 determines the rate of the printable character strings of the output information in the block information. The procedure here is the same as that of Step S1604.

In Step S1606, the character-string rate determination section 160 calculates "'printable character-string rate of input'—'printable character-string rate of output'", as a difference between the printable character-string rate of an input and the printable character-string rate of an output.

In Step S1607, when the difference calculated in Step S1606 is at or above a threshold $\theta$, the character-string rate determination section 160 adds the same block information Bi to the encryption logic list 1 (163). Note that c and $\theta$ given above are adjustable parameters.

Alternatively, in Step S1604, a file-type examination of the input information may also be performed. If the input is a file in a known file format such as WORD or PDF, text information is extracted according to that specific file format, and the printable character-string rate is calculated just for that text information. This allows the printable character-string rate of the input information to be calculated appropriately even if the input information is a type of the file, such as a WORD file or a PDF file, obtained by encoding text into a special format. The file-type examination can be performed by utilizing a known tool.

Second Working Example

Malicious programs such as malware can encode (e.g., Base64 encoding) encrypted data into printable data and then transmit the printable data on the Internet.

FIG. 9 is a diagram illustrating an example (1) of how malware uses an encryption function.

Referring to the example shown in FIG. 9, malware encodes, through Base64 encoding, ciphertext obtained by encrypting a message through an encryption function, and transmits the encoded ciphertext on the Internet through HTTP transmission. Given this fact, it is possible that the output information of a block is decoded by a known decoder (e.g., Base64 decoder), and when the decoding succeeds, then the block whose output information is equivalent to the decoded value is determined as an encryption logic candidate. A second working example describes a working example of specifying encryption logic by utilizing a characteristic of encoding included in the input/output information of an encryption function like the one described above, as the characteristic determination information.

Figure 10:
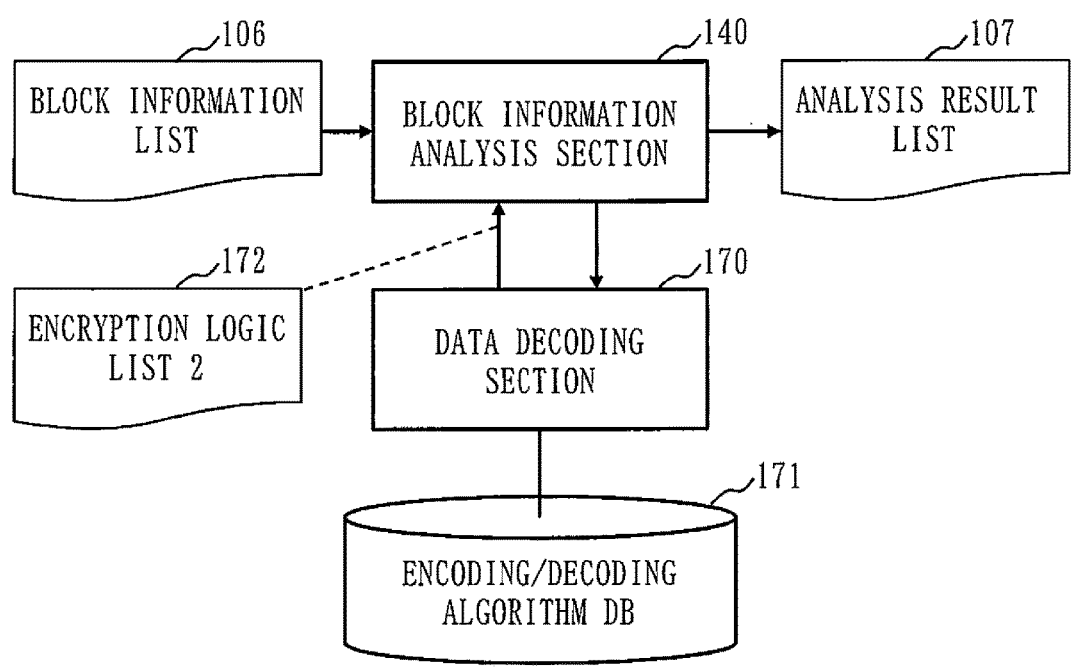
FIG. 10 is a configuration diagram illustrating an example of the configuration of a process analysis apparatus according to a second working example.

FIG. 10 is a configuration diagram illustrating an example of the configuration of a process analysis apparatus according to the second working example.

Referring to FIG. 10, the block information analysis section 140 includes a data decoding section 170 and an encoding/decoding algorithm DB 171. The block information analysis section 140 receives the block information list 106, performs decoding determination, and outputs the analysis result list 107. The data decoding section 170 also decodes the output information of the block information inputted from the block information analysis section 140, and when the decoding succeeds, outputs an encryption logic list 2 (172) including an encryption logic candidate which is a block whose output information is equivalent to the decoded value, to the block information analysis section 140.

Alternatively, the data decoding section 170 and the encoding/decoding algorithm DB 171 are included in the block information analysis section 140.

A flow of a decoding determination process of the second working example is discussed below with reference to FIG. 11.

Figure 11:
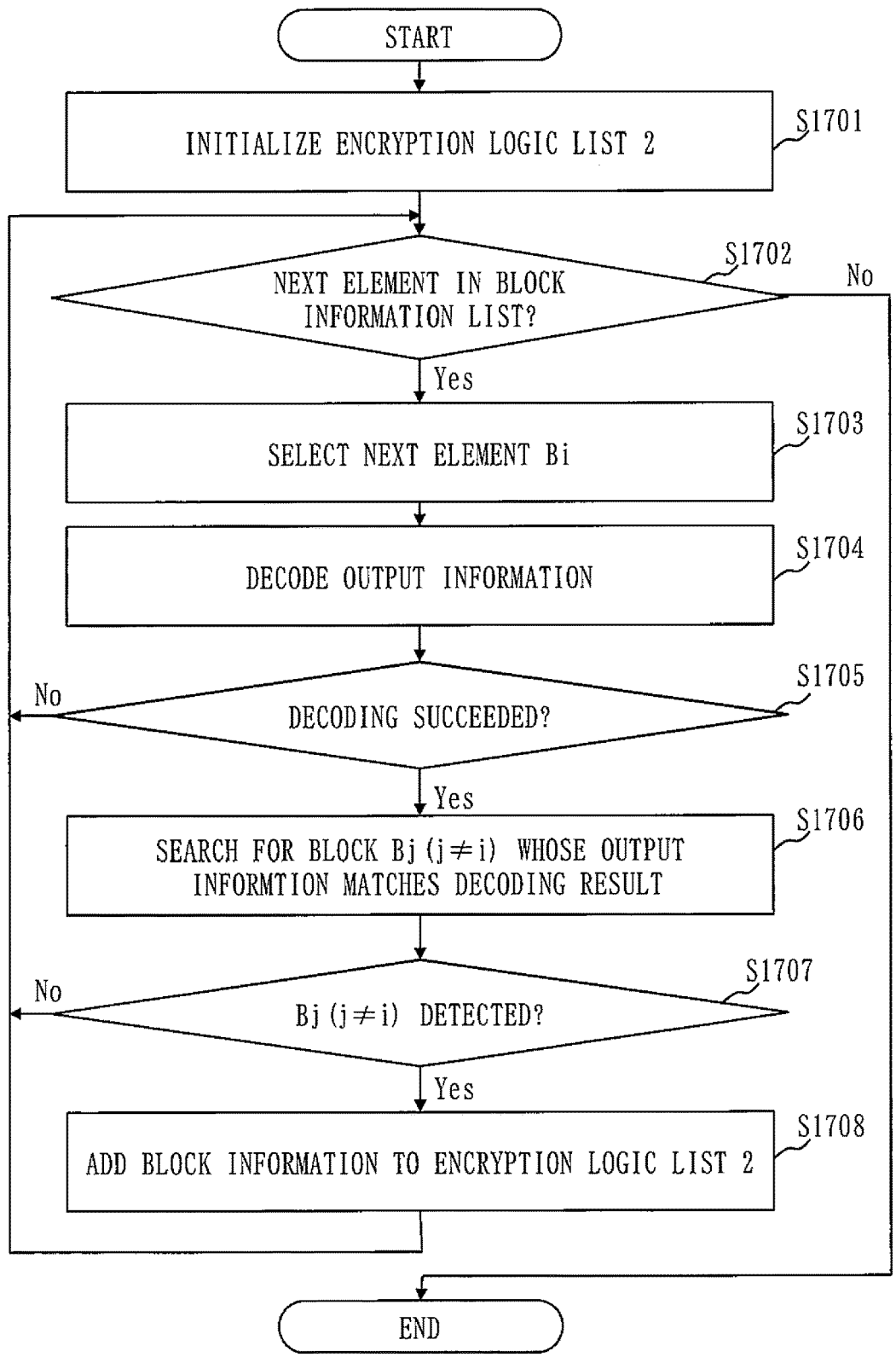
FIG. 11 is a flow chart illustrating a flow of decoding determination by a data decoding section 170 according to the second working example.

FIG. 11 is a flow chart illustrating a flow of the decoding determination process of the data decoding section 170 according to the second working example.

First, in Step S1701, the data decoding section 170 initializes the encryption logic list 2 (172). The encryption logic list 2 (172) is the block information list 106 that stores the block information determined as an encryption logic candidate in the data decoding section 170.

In Step S1702, the data decoding section 170 confirms whether there is the next element (block information) in the block information list 106. When there is no block information of the next element, the process comes to an end, proceeding through the branch of No. When there is the block information of the next element, the next element Bi is selected in Step S1703.

In Step S1704, the data decoding section 170 decodes the output information of the block information by utilizing a known decoding algorithm. Known decoding algorithms are stored in the encoding/decoding algorithm DB 171. The data decoding section 170 decodes the output information whose information type is "buffer".

In Step S1705, the data decoding section 170 determines whether or not the decoding has succeeded. When the decoding succeeds with one of decoding algorithms stored in the encoding/decoding algorithm DB 171, the data decoding section 170 holds the decoding result and then proceeds to Step S1707 through the branch of Yes.

In Step S1707, the data decoding section 170 searches the block information list 106 to the block whose output information matches the decoding result held in Step S1705. Alternatively, the search may be limited for the block whose context is older than that of the block Bi, for efficient processing. When detecting the block Bj (i≠j) whose output information that matches the decoding result as a result of searching the block information list 106, the data decoding section 170 adds the block information of the block Bj to the encryption logic candidate list 2 (172), in Step S1708.

Third Working Example

Malicious programs such as malware can compress data before the data is encrypted.

Figure 12:
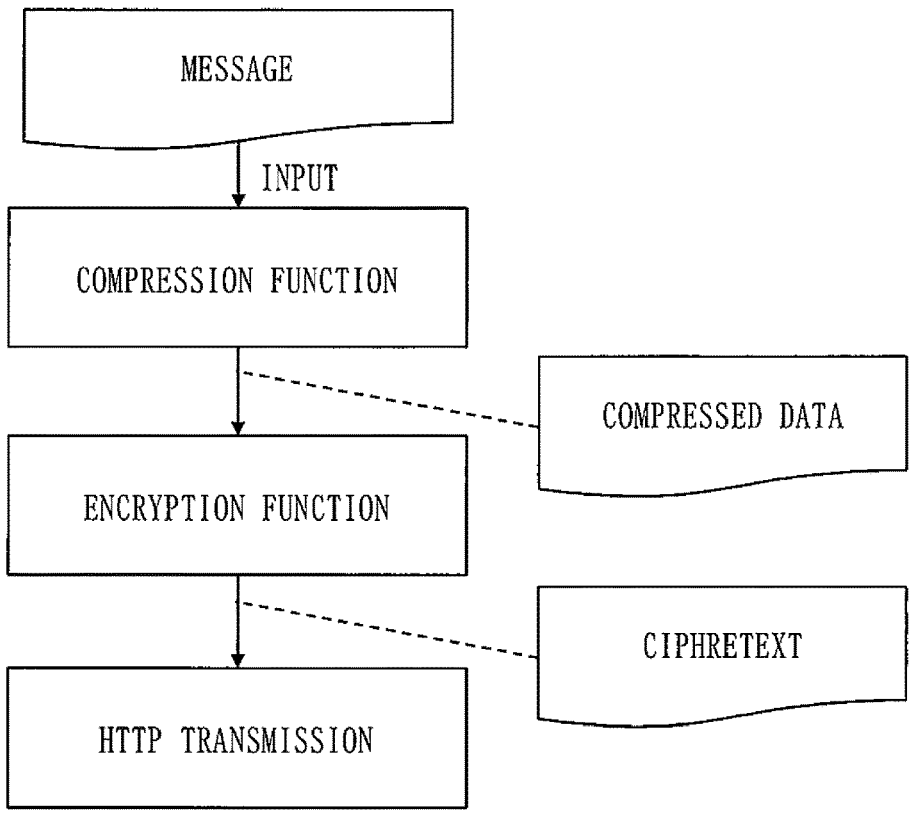
FIG. 12 is a diagram illustrating an example (2) of how to use an encryption function of malware.

FIG. 12 is a diagram illustrating an example (2) of how malware uses an encryption function.

Referring to the example shown in FIG. 12, malware compresses a message through a compression function before the message is inputted to an encryption function, and transmits ciphertext obtained by encrypting this compressed data through the encryption function, on the Internet through HTTP transmission. Given this fact, it is possible to try decompressing the input information of the block with a known decompression algorithm (e.g., zip, izh), and when the decompression succeeds, then the block is determined as an encryption logic candidate. A third working example describes a working example of specifying encryption logic by utilizing the characteristic of the compression process included in the input/output information of an encryption function, as the characteristic determination information.

Figure 13:
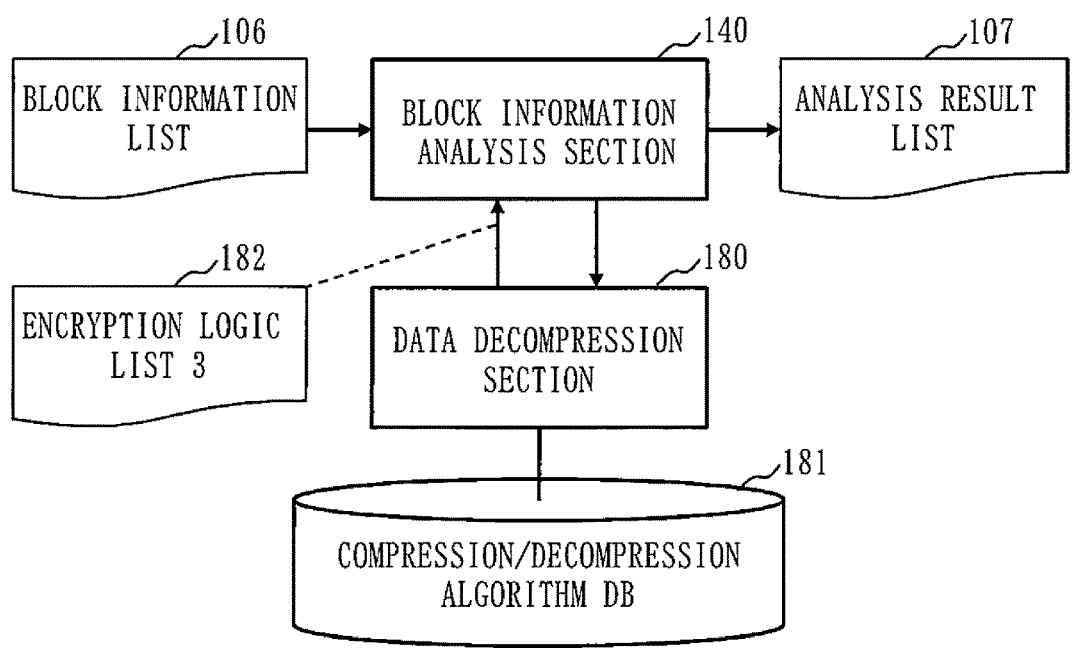
FIG. 13 is a configuration diagram illustrating an example of the configuration of a process analysis apparatus according to a third working example.

FIG. 13 is a configuration diagram illustrating an example of the configuration of a process analysis apparatus according to the third working example.

Referring to FIG. 13, the block information analysis section 140 includes a data decompression section 180 and a compression/decompression algorithm DB 181. The block information analysis section 140 receives the block information list 106, performs data-decompression determination, and outputs the analysis result list 107. The data decompression section 180 decompresses the input information of the block information inputted from the block information analysis section 140. When the decompression succeeds, the data decompression section 180 determines the block as an encryption logic candidate, and outputs an encryption logic list 3 (182) including the encryption logic candidate to the block information analysis section 140.

Alternatively, the data decompression section 180 and the compression/decompression algorithm DB 181 may be included in the block information analysis section 140.

A flow of a data decompression determination process according to the third working example is discussed with reference to FIG. 14.

Figure 14:
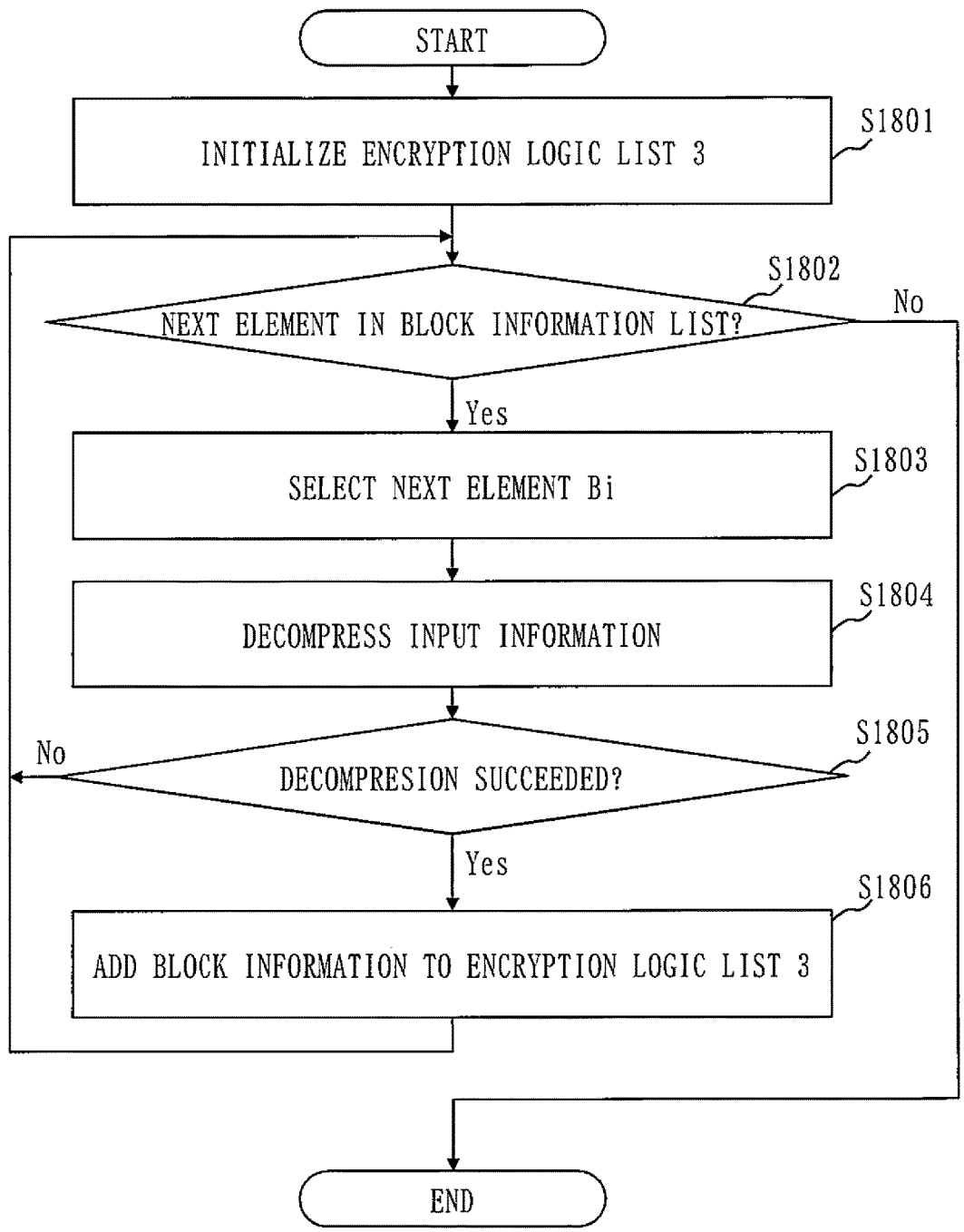
FIG. 14 is a flow chart illustrating a flow of data decompression determination by a data decompression section 180 according to the third working example.

FIG. 14 is a flow chart illustrating a flow of a decompression determination process of the working example 3.

First, in Step S1801, the data decompression section 180 initializes the encryption logic list 3 (182). The encryption logic list 3 (182) is the block information list 106 that stores the block information determined as encryption logic candidate in the data decompression section 180.

In Step S1802, the data decompression section 180 confirms whether there is the next element (block information) in the block information list 106. When there is no block information of the next element, the process comes to an end, proceeding through the branch of No. When there is the block information of the next element, the next element Bi is selected in step S1803.

In Step S1804, the data decompression section 180 decompresses the input information of the block information by utilizing a known decompression algorithm. Known decompression algorithms are stored in the compression/decompression decoding algorithm DB 181. The data decompression section 180 decompresses the input information whose information type is "buffer".

In Step S1805, the data decompression section 180 determines whether or not the decompression has succeeded. When the decompression succeeds with one of the decompression algorithms stored in the compression/decompression algorithm DB 181, the data decompression section 180 proceeds to S1806 through the branch of Yes.

In Step S1806, the data decompression section 180 adds the block information of the block Bj to the encryption logic candidate list 3 (182).

Fourth Working Example

In accordance with the basic definition of cryptography, it is obvious that ciphertext obtained by encrypting a message (plaintext) with a key can be decoded with the same key to obtain the original message. Therefore, m=Dec (k, Enc (k, m)) is satisfied where an encryption function, a decryption function, a key and plaintext, are represented by "Enc", "Dec", "k", and "m" denote, respectively.

Figure 15:
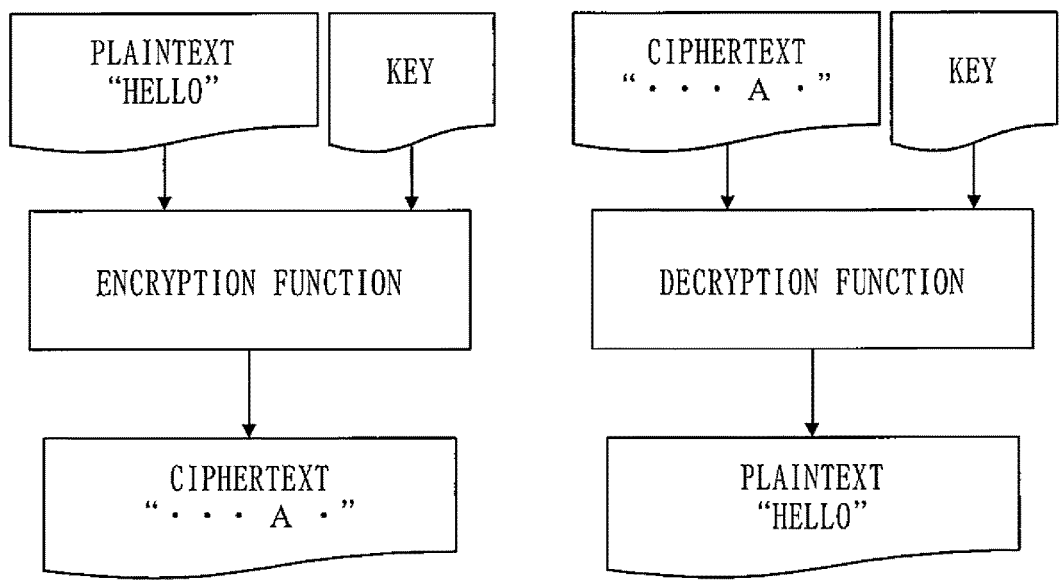
FIG. 15 is a diagram illustrating a basic definition of cryptography.

FIG. 15 is a diagram illustrating the basic definition of cryptography.

Referring to FIG. 15, when plaintext "Hello" is encrypted with a key to obtain ciphertext ". . . A . ", the plaintext "Hello" of the original message can be obtained by decrypting the ciphertext ". . . A . " with the same key.

In accordance with the basic definition of cryptography described above, when part (ciphertext, assumingly) of an output of a block "f" is used as part of an input of another block "g", and then "g" is processed, if the output of "g" matches the input (plaintext, assumingly) of "f", then it is highly likely that "f" is an encryption function and "g" is a decryption function. Given this fact, if a pair of blocks is selected, and the input information and the output information of those blocks are processed based on the basic definition of cryptography, then the pair of blocks can be determined as an encryption logic candidate. A fourth working example describes a working example of specifying encryption logic by finding out the pair of blocks that satisfies the relation of the basic definition of cryptography, and then utilizing the characteristic of the input/output information based on the basic definition of cryptography, as the characteristic determination information.

Figure 16:
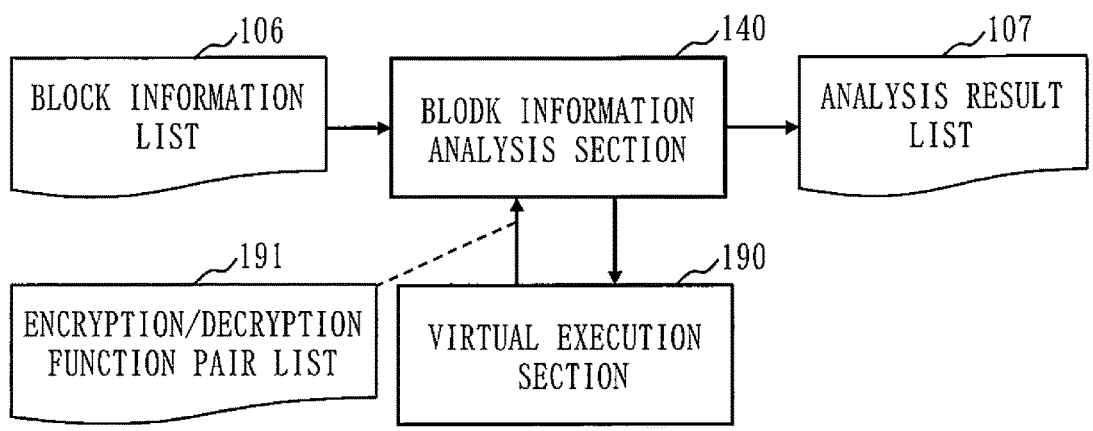
FIG. 16 is a configuration diagram illustrating an example of the configuration of a process analysis apparatus according to a fourth working example.

FIG. 16 is a configuration diagram illustrating an example of the configuration of a process analysis apparatus according to the fourth working example.

Referring to FIG. 16, the block information analysis section 140 includes a virtual execution section 190.

The block information analysis section 140 receives the block information list 106, performs a virtual execution determination process, and outputs the analysis result list 107. The virtual execution section 190 performs virtual execution on a pair of blocks, based on the basic definition of cryptography, by utilizing the input information and output information of the block information inputted from the block information analysis section 140. When the virtual execution succeeds, the virtual execution section 190 determines the pair of blocks as an encryption/decryption function pair candidate, and outputs an encryption/decryption function pair list 191 including the encryption/decryption function pair candidate, to the block information analysis section 140.

Alternatively, the virtual execution section 190 may be included in the block information analysis section 140.

A flow of a virtual execution determination process according to the fourth working example is discussed below with reference to FIG. 17.

Figure 17:
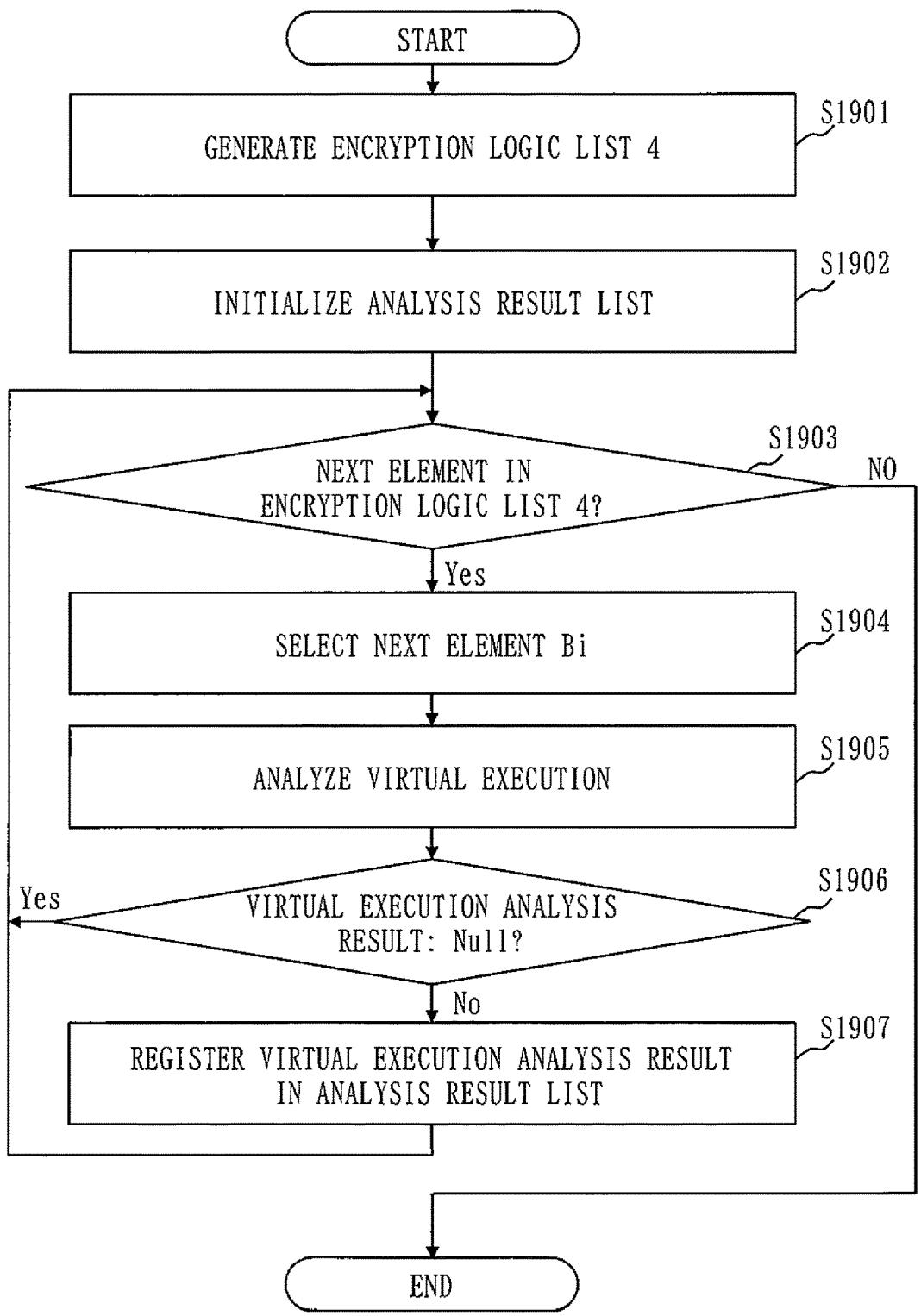
FIG. 17 is a flow chart illustrating a flow of virtual execution determination by a virtual execution section 190 according to the fourth working example.

FIG. 17 is a flow chart illustrating a flow of a virtual execution determination process of the virtual execution section 190 according to the fourth working example.

First, in Step S1901, the virtual execution section 190 merges previously extracted encryption logic candidates to generate an encryption logic list 4. As the previously extracted encryption logic candidates, the encryption logic lists 1 to 3, which are the encryption logic candidates determined in the first working example to the third working example, are used, for example. Further in generating the encryption logic list 4, if an encryption logic candidate is duplicated, the duplicated logic candidates are unified In Step S1902, the virtual execution section 190 initializes the analysis result list 107. The analysis result list 107 is a list of pairs of pieces of the block information determined as a pair of encryption logic and decryption logic, in the virtual execution section 190.

In Step S1903, the virtual execution section 190 confirms whether there is the next element (block information) in the encryption logic list 4. When there is no block information of the next element, the process comes to an end, proceeding through the branch of No. When there is the block information of the next element, the next element Bi is selected in Step S1904.

In Step S1905, the virtual execution section 190 performs virtual execution analysis using the basic definition of cryptography by utilizing the output information of the next element Bi. The process of virtual execution analysis will be described later in detail.

In Step S1906, the virtual execution section 190 determines whether or not the virtual execution analysis result is Null. When the virtual execution analysis result is not Null, the process proceeds to Step S1907 through the branch of No.

In Step S1907, the virtual execution section 190 registers the virtual execution analysis result in the analysis result list 107.

A flow of virtual execution analysis in Step S1905 is discussed in detail with reference to FIG. 18 and FIG. 19.

Figure 18:
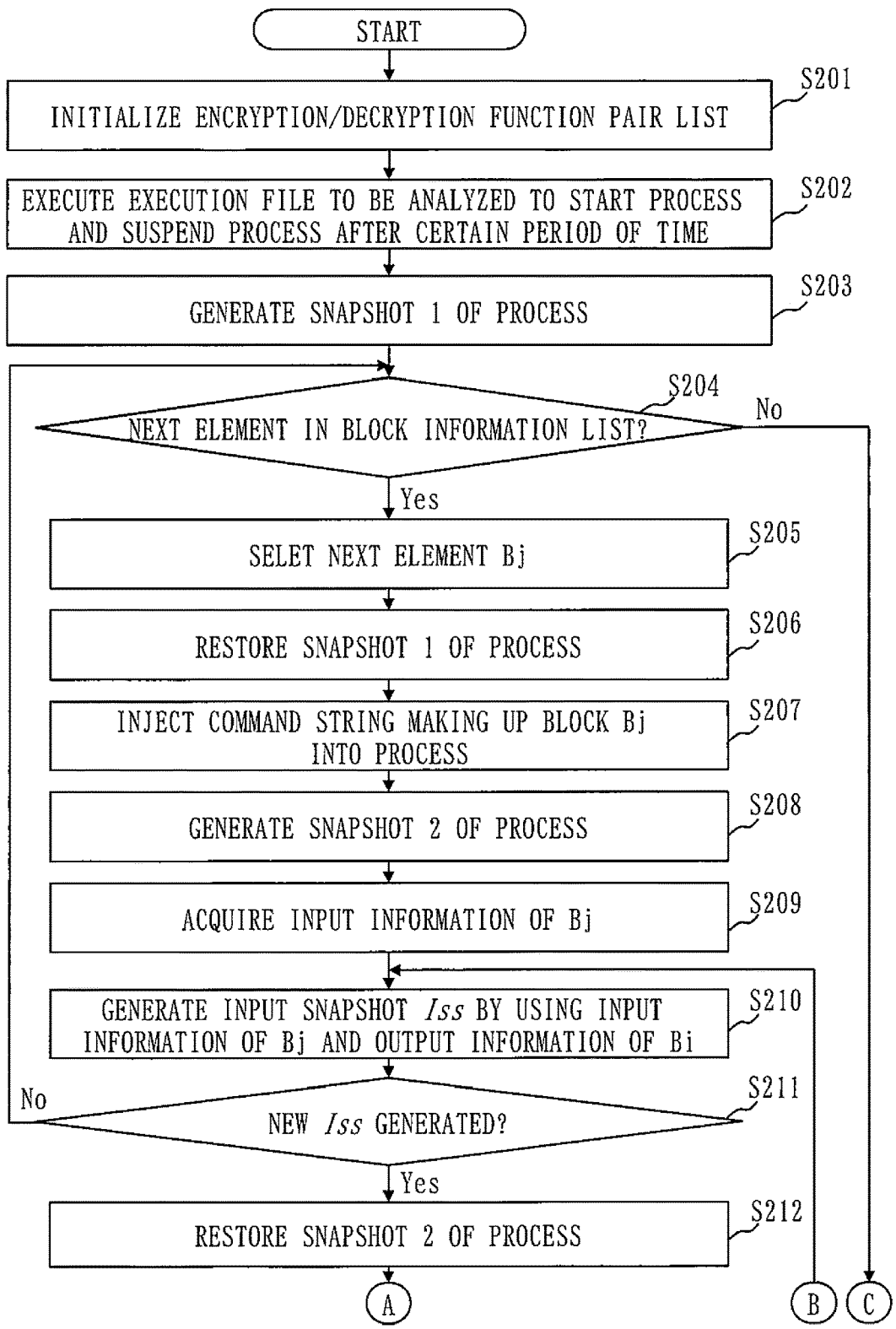
FIG. 18 is a flow chart illustrating a flow (first half) of virtual execution analysis by the virtual execution section 190 according to the fourth working example.

FIG. 18 is a flow chart illustrating a flow (first half) of virtual execution analysis of the virtual execution section 190 according to the fourth working example 4.

FIG. 19 is a flow chart illustrating a flow (last half) of the virtual execution analysis of the virtual execution section 190 according to the fourth working example 4.

In the virtual execution analyses of Step S1905. the virtual execution section 190 is provided with the block information Bi and an execution file to be analyzed as parameters.

First, in Step S201, the virtual execution section 190 initializes the encryption/decryption function pair list.

In Step S202, the virtual execution section 190 executes the execution file 101 to be analyzed, in a virtual environment, to start the process, and then suspends the process after a certain period of time.

In Step S203, the virtual execution section 190 generates a snapshot of the process, which is called Snapshot 1.

In Step S204, the virtual execution section 190 confirms whether there is the next element (block information) in the block information list 106. When there is no block information of the next element, the process proceeds to Step S222, through the branch of No, where the coding/decryption function pair list is returned, and the process ends. When there is the block information of the next element, the next element Bj is selected in Step S205. Alternatively, it is also possible to confirm the contexts of the block Bi and the block Bj, and then select the block Bj which is not in a nest relation.

In Step S206, the virtual execution section 190 restores the Snapshot 1 of the process.

In Step S207, the virtual execution section 190 injects the process with a command string making up the block Bj. More specifically, the virtual execution section 190 searches the block list 104 for the element corresponding to the block ID of the block information Bj, and acquires the command string of the block and the beginning address. Then, the virtual execution section 190 injects the command string at the beginning address of the process.

In Step S208, the virtual execution section 190 generates the snapshot of that process, which is called Snapshot 2.

In Step S209, the virtual execution section 190 acquires the input information of Bj.

In Step S210, the virtual execution section 190 generates an input snapshot Iss, based on the input information of Bj and the output information of Bi. The input snapshot is the information that is an input of the block to be executed. The input snapshot Iss is generated as follows. Assuming that the block Bi has n pieces of the output information, the block Bi is expressed as $O=\{O1-On\}$. Assuming that the block Bj has m pieces of the input information, the block Bj is expressed as $I=\{I1-Im\}$. Assuming that $Oi \in O$), Iss is the input information obtained by replacing the j-th element of I by Oi. The replacement is performed between pieces of information whose types of input/output information are "buffer". Alternatively, it is also possible to select pieces of information whose sizes are similar to each other on a priority basis for replacement. The replacement is performed with respect to the value and the size. Further, the replacement is performed so that the same Iss is not duplicated.

In Step S211, the virtual execution section 190 determines whether a new Iss has been generated. When there is no new Iss generated, the process proceeds to execute Step S204, through the branch of No. When there is a new Iss generated, the process proceeds to S212 where the virtual execution section 190 restores the Snapshot 2 of the process, and reflects the Iss on the same process in Step S213. In the reflection of the Iss, the values of all the pieces of the input information in the Iss are set in an appropriate storage area (register, memory).

In Step S214, the virtual execution section 190 sets, in an Instruction Register, the beginning address of the injected command string, and resumes the process in Step S215.

In Step S216, the virtual execution section 190 monitors the execution address of the process and confirms whether or not the execution address goes beyond the range of the block Bj.

In Step 217, the virtual execution section 190 determines whether or not the execution of the block has come to an end. When the execution address being monitored goes beyond the range of the block Bj, the virtual execution section 190 determines that the execution of the block Bj has come to an end, and suspends the process in Step S218.

In Step S219, the virtual execution section 190 compares the output information of the executed block Bj with the input information of the block Bi. The output information obtained by executing the block Bj is extracted from the memory of the process being suspended, based on the beginning address of the output information of the block Bj.

In Step S220, the virtual execution section 190 determines whether the output information of the block Bj matches the input information of the block Bi. When they match, the process proceeds through the branch of Yes to Step S221 where the virtual execution section 190 registers the block Bi and the block Bj in the encryption/decryption function pair list, as a pair of encryption logic and decryption logic.

Alternatively, in Step S207, the process may be continued until the beginning address of the block, instead of injecting the command string of the block. In that case, the processing of Step S214 is skipped, and the process is resumed at Step S215.

Thus, the invention discussed in the first to fourth working examples has the advantageous effect of specifying, with accuracy, encryption logic used by malware, by generating the characteristic determination information for determining the characteristic of the input/output relation of a block extracted from the execution trace; analyzing the input/output relation of the block, using this characteristic determination information; and determining that a block indicating the characteristic of the input/output relation of an encryption function and a decryption function, as encryption logic.

REFERENCE SIGNS LIST 100 process analysis apparatus
101 execution file
102 execution trace
103 process information
104 block list
105 definition list
106 block information list
107 analysis result list
110 execution trace acquisition section
120 block extraction section
130 block information extraction section
140 block information analysis section
150 analysis result output section
160 character-string rate determination section
161 character code determination algorithm DB
162 character code table DB
163 encryption logic list 1
170 data decoding section
171 encoding/decoding algorithm DB
172 encryption logic list 2
180 data decompression section
181 compression/decompression algorithm DB
182 encryption logic list 3
190 virtual execution section
191 encryption/decryption function pair list

The invention claimed is:

1. A process analysis apparatus comprising processing circuitry to:
   acquire an execution trace of a process to be analyzed;
   extract, from the execution trace, a block that is a program element indicating a loop structure;
   extract, from the block, block information including input information and output information including a value written in a storage area, wherein the extracted input information is determined to satisfy conditions of being defined prior to execution of the block, and being read prior to overwriting during execution of the block;
   generate characteristic determination information for determining a characteristic of an input/output relation of the block, using one of the input information and the output information of the block information;
   analyze the input/output relation of the block, using the characteristic determination information to determine whether the characteristic of the input/output relation of the block is one of an encryption function and a decryption function; and
   when the characteristic of the input/output relation of the block is determined to be one of an encryption function and a decryption function, further analyze the block to perform at least one of:
     detecting malware within the process, and
     processing encryption logic from the block to identify information compromised by the malware within the process.

2. The process analysis apparatus of claim 1, wherein the processing circuitry:
    decodes the output information of the block information;
    generates, as the characteristic determination information, a decoding result obtained by decoding the output information of the block information; and
    determines the block which has the output information that matches the decoding result, as encryption logic.

3. The process analysis apparatus of claim 1, wherein the processing circuitry:
    decompresses the output information of the block information;
    generates, as the characteristic determination information, a decoding result obtained by decompressing the output information of the block information by the data decompression section; and
    determines the bock which has the output information that matches the decoding result, as the encryption logic.

4. The process analysis apparatus of claim 1, wherein the processing circuitry:
    inputs the output information of the block information to another block, and execute a process of the another block,
    generates, as the characteristic determination information, an execution result obtained by executing the process of the another block, and
    determines a block which has the input information that matches the execution result, as the encryption logic.

5. A process analysis apparatus comprising processing circuitry to:
    acquire an execution trace of a process to be analyzed;
    extract, from the execution trace, a block that is a program element indicating a loop structure;
    extract, from the block, block information including input information and output information including a value written in a storage area;
    generate characteristic determination information for determining a characteristic of an input/output relation of the block, using one of the input information and the output information of the block information;
    analyze the input/output relation of the block, using the characteristic determination information to determine whether the characteristic of the input/output relation of the block is one of an encryption function and a decryption function; and
    when the characteristic of the input/output relation of the block is determined to be one of an encryption function and a decryption function, further analyze the block to perform at least one of:
        detecting malware within the process, and
        processing encryption logic from the block to identify information compromised by the malware within the process,
    wherein the processing circuitry determines a printable character-string rate which is a rate of printable character strings in one of the input information and the output information of the block information;
    calculates, as the characteristic determination information, a difference between a first printable character-string rate of the input information and a second printable character-string rate of the output information, which have been determined by the character-string rate determination section; and
    when the difference is at or above a predetermined threshold, determines the block to be encryption logic.

6. A process analysis method of a process analysis apparatus to analyze a process to be analyzed and determine encryption logic, the process analysis method comprising:
    acquiring an execution trace of the process to be analyzed;
    extracting, from the execution trace, a block that is a program element indicating a loop structure:
    extracting, from the block, block information including input information and output information including a value written in a storage area, wherein the extracted input information is determined to satisfy conditions of
        being defined prior to execution of the block, and
        being read prior to overwriting during execution of the block;
    generating characteristic determination information for determining a characteristic of an input/output relation of the block, using one of the input information and the output information of the block information;
    analyzing the input/output relation of the block, using the characteristic determination information to determine whether the characteristic of the input/output relation of the block is one of an encryption function and a decryption function; and
    when the characteristic of the input/output relation of the block is determined to be one of an encryption function and a decryption function, further analyzing the block to perform at least one of:
        detecting malware within the process, and
        processing encryption logic from the block to identify information compromised by the malware within the process.

7. A non-transitory computer readable medium including a process analysis program causing a computer to:
    acquire an execution trace of a process to be analyzed;
    extract, from the execution trace, a block that is a program element indicating a loop structure:
    extract, from the block, block information including input information and output information including a value written in a storage area, wherein the extracted input information is determined to satisfy conditions of
        being defined prior to execution of the block, and
        being read prior to overwriting during execution of the block;
    generate characteristic determination information for determining a characteristic of an input/output relation of the block, using one of the input information and the output information of the block information,
    analyze the input/output relation of the block, using the characteristic determination information, to determine whether the characteristic of the input/output relation of the block is one of an encryption function and a decryption function; and
    when the characteristic of the input/output relation of the block is determined to be one of an encryption function and a decryption function, further analyze the block to perform at least one of:
        detecting malware within the process, and
        processing encryption logic from the block to identify information compromised by the malware within the process.

* * * * *